(12) United States Patent
Ruutu

(10) Patent No.: US 7,493,623 B2
(45) Date of Patent: Feb. 17, 2009

(54) SYSTEM AND METHOD FOR IDENTIFYING APPLICATIONS TARGETED FOR MESSAGE RECEIPT IN DEVICES UTILIZING MESSAGE QUEUES

(75) Inventor: Jussi Pekka Ruutu, Espoo (FI)

(73) Assignee: Nokia Corporation, Espoo (FI)

( * ) Notice: Subject to any disclaimer, the term of this patent is extended or adjusted under 35 U.S.C. 154(b) by 819 days.

(21) Appl. No.: 10/359,044

(22) Filed: Feb. 5, 2003

(65) Prior Publication Data

US 2004/0205769 A1    Oct. 14, 2004

(51) Int. Cl.
G06F 3/00 (2006.01)
G06F 9/44 (2006.01)
G06F 9/46 (2006.01)
G06F 13/00 (2006.01)
G06F 15/16 (2006.01)

(52) U.S. Cl. .................. 719/314; 719/313; 709/232

(58) Field of Classification Search ......... 719/313–314, 719/328; 709/245, 232; 370/235, 412
See application file for complete search history.

(56) References Cited

U.S. PATENT DOCUMENTS

| | | | |
|---|---|---|---|
| 5,519,689 A | 5/1996 | Kim | |
| 5,574,720 A | 11/1996 | Lee | |
| 5,696,701 A | 12/1997 | Burgess et al. | |
| 5,805,823 A * | 9/1998 | Seitz | 709/236 |
| 5,828,653 A | 10/1998 | Goss | |
| 6,046,981 A | 4/2000 | Ramamurthy et al. | |
| 6,108,307 A * | 8/2000 | McConnell et al. | 370/235 |
| 6,115,365 A | 9/2000 | Newberg et al. | |
| 6,147,970 A | 11/2000 | Troxel | |
| 6,182,146 B1 | 1/2001 | Graham-Cumming, Jr. | |
| 6,212,361 B1 | 4/2001 | Lui | |
| 6,279,041 B1 * | 8/2001 | Baber et al. | 709/232 |
| 6,349,341 B1 | 2/2002 | Likes | |
| 6,466,984 B1 | 10/2002 | Naveh et al. | |
| 6,477,167 B1 | 11/2002 | Wu | |
| 6,529,932 B1 * | 3/2003 | Dadiomov et al. | 718/101 |
| 6,608,816 B1 | 8/2003 | Nichols | |
| 6,614,790 B1 | 9/2003 | Veres et al. | |

(Continued)

FOREIGN PATENT DOCUMENTS

GB    2 338 372 A    12/1999

(Continued)

OTHER PUBLICATIONS

Tanenbaum, Andrew, "Computer Networks" Aug. 2002, Prentice Hall, Fourth Edition, pp. 493-496.*

(Continued)

Primary Examiner—Meng-Ai An
Assistant Examiner—Qing-Yuan Wu
(74) Attorney, Agent, or Firm—Hollingsworth & Funk, LLC

(57) ABSTRACT

A system, apparatus, and method for facilitating the communication of messages between applications. Application identifiers, and corresponding outbound logical connection identifiers associated with message transfers from applications identifiable by their respective application identifiers, are acquired. Associations between the application identifiers and their corresponding outbound logical connection identifiers are established. Responsive inbound messages are directed to the applications having application identifiers that are associated with the outbound logical connection identifiers that correspond to the inbound logical connection identifiers of the responsive inbound messages.

40 Claims, 11 Drawing Sheets

U.S. PATENT DOCUMENTS

| | | | |
|---|---|---|---|
| 6,633,575 B1 | 10/2003 | Koodli | |
| 6,771,646 B1 * | 8/2004 | Sarkissian et al. | 370/392 |
| 6,789,116 B1 * | 9/2004 | Sarkissian et al. | 709/224 |
| 6,859,835 B1 * | 2/2005 | Hipp | 709/227 |
| 6,862,629 B1 * | 3/2005 | Hericourt | 709/238 |
| 6,950,873 B2 * | 9/2005 | Jain et al. | 709/228 |

FOREIGN PATENT DOCUMENTS

| | | |
|---|---|---|
| GB | 2338372 | 12/1999 |

OTHER PUBLICATIONS

BEA MessageQ Datasheet, http://www.bea.com/products/messageq/datasheet.shtml (printed from internet on Jan. 8, 2003).

* cited by examiner

SYSTEM AND METHOD FOR IDENTIFYING APPLICATIONS TARGETED FOR MESSAGE RECEIPT IN DEVICES UTILIZING MESSAGE QUEUES

FIELD OF THE INVENTION

This invention relates in general to communications, and more particularly to a system and method for maintaining associations between applications and transports, to facilitate location of a particular application or application instance to which a responsive message is directed.

BACKGROUND OF THE INVENTION

While computers are still used for their traditional processing purposes, advances in communication infrastructures and protocols have turned standard computing devices into valuable communication tools. Computers communicate with each other, and with other electronic devices, over networks ranging from local area networks (LANs) to wide reaching global area networks (GANs) such as the Internet. Other electronic devices have experienced similar transformations, such as mobile phones, personal digital assistants (PDAs), and the like. Today, these wireless devices are being used for a variety of different types of communication. For example, while the analog mobile phone was traditionally used for analog voice communications, the mobile phone of the present and future is a powerful communication tool capable of communicating voice, data, images, video, and other multimedia content. PDAs, once the portable calendaring and organizational tool, now often include network communication capabilities such as e-mail, Internet access, etc. With the integration of wireless and landline network infrastructures, information of all sorts can be conveniently communicated between wireless and landline terminals.

In carrying out such communications between devices, the programs, applications, application instances, and the like (hereinafter "applications") operable on such devices often need to communicate with applications on other devices. For example, an application at the application layer may generate messages that are communicated to lower levels of the software architecture including, e.g., the transport layer, network layer, data link layer, and physical layer, where the encapsulated messages are transmitted over the network to other devices. Messages received at the receiving device move up the software architecture to ultimately provide the original message to an application on the receiving device.

To facilitate the communication of messages, message queues may be used. Generally, a message queue relates to the functionality that receives messages from an application and forwards them to a recipient application. The message queue serves as a temporary storage facility for traveling messages. Such message queues generally reside in the devices that are sending and receiving the messages, and alternatively may reside in an intermediary computing system on the network logically positioned between the sending and receiving devices.

The use of message queues removes many aspects of the message communication from the applications themselves. A message queue stores messages, such as when there is no connectivity between the communicating applications. Another benefit is the reliability, as the use of message queues provides safe and orderly delivery of messages. Thus, one benefit of utilizing message queues is that it obviates the need for application developers to develop, or even fully understand, the underlying functionality for performing these orderly transfers of messages to and from their applications.

When a message queue receives a message from the transport layer, it must know to which application instance the message is directed. It is not always enough to recognize the application type since the host may have several instances of the application software running at the same time. Moreover, the situation becomes more complicated where application instances are suspended, or terminated. Thus, the message must be passed to the correct application when it is activated or reactivated.

Where message queues are not used, this problem does not occur, since the application instance directly activates and uses the transport protocol instance. However, when a message queue is used, this association is lost. One solution is to introduce message queues at both ends so that it is possible to use a specific (and possibly proprietary) protocol or packet header to uniquely identify the communicating applications. For example, the sending message queue adds a proprietary message queue header that contains a unique identifier.

However, this approach limits the use of message queue only to those cases when both communication ends support the same kind of message queue. This leads to fragmentation, and is not desirable from the developer's point of view. In such a case, the developer must make different versions of the software or include support for cases where there is, and is not, a message queue at the other end.

Accordingly, it would be desirable to provide a manner in which a message queue may be deployed only at one side of the end-to-end communication channel. It would also be desirable to overcome the need to have (possibly proprietary) protocol and/or packet headers between the communicating ends for uniquely identifying the communicating peers. The present invention provides a solution to these and other problems of the prior art, and provides additional advantages over prior art message transactions implementing message queues.

SUMMARY OF THE INVENTION

To overcome limitations in the prior art described above, and to overcome other limitations that will become apparent upon reading and understanding the present specification, the present invention discloses a system and method for communicating messages between applications.

In accordance with one embodiment of the invention, a method is provided for facilitating communication of messages between applications. The method includes acquiring application identifiers, and acquiring corresponding outbound logical connection identifiers associated with message transfers from applications identifiable by their respective application identifiers. Associations between the application identifiers and their corresponding outbound logical connection identifiers are established. Responsive inbound messages are directed to the applications having application identifiers that are associated with the outbound logical connection identifiers that correspond to the inbound logical connection identifiers of the responsive inbound messages.

In a more particular embodiment of such a method, the inbound logical connection identifiers are compared to the outbound logical connection identifiers of the established associations, and at least one outbound logical connection identifier that matches the inbound logical connection identifier is identified. Using the application identifier having an established association with the matching outbound logical connection identifier, the application to which the responsive inbound message is to be directed can be identified. In accordance with other particular embodiments, the outbound logical connection identifiers may include outbound transport identifiers, outbound socket identifiers, outbound transport process or thread identifiers associated with a transport process or thread respectively, a port identifier, a session identifier, etc. In accordance with still other particular embodiments of such a method, establishing associations includes any of creating a link between each of the application identifiers and its corresponding outbound logical connection identifier, correlating the application identifiers and their corresponding outbound logical connection identifiers via an entry in a table, creating a table of entries where each of the entries includes one of the application identifiers and its corresponding outbound logical connection identifier used to transfer a particular message, etc. In one particular embodiment, creating a table of entries includes creating the table of entries using a Message Queue (MQ). Such a method may also be implemented via software instructions stored on a computer-readable medium.

In accordance with another embodiment of the invention, a method is provided for identifying an application among a plurality of applications that is the target of at least one responsive message using a Message Queue (MQ). The method includes receiving an application identifier and an outbound transport identifier, where the outbound transport identifier uniquely identifies a logical connection for a message transfer from the application identified by the application identifier. An association between the application identifier and the outbound transport identifier is created. An inbound transport identifier associated with receipt of a responsive message and destined for the application may be received. An application may then be identified as the target of the responsive message by matching the inbound transport identifier to the outbound transport identifier. The particular application identifier for the application may be determined from the association between the application identifier and the matched outbound transport identifier. In one particular embodiment, such a method is implemented via software instructions stored on a computer-readable medium.

In accordance with another embodiment of the invention, a source device operable on a network and capable of communicating messages with at least one destination device is provided. The source device includes a memory to store affiliations of application identifiers and corresponding outbound logical connection identifiers for each of one or more outbound messages communicated from the source device. A Message Queue (MQ) module is configured to compare inbound logical connection identifiers of inbound messages to the outbound logical connection identifiers of the stored affiliations. The MQ identifies the local application having the application identifier affiliated with the outbound logical connection identifier that matches the inbound logical connection identifier.

In a more particular embodiment of such a source device, the MQ module is implemented in software, and the source device includes a processor configured to execute the MQ software to establish the affiliations of application identifiers and corresponding outbound logical connection identifiers, to compare the inbound logical connection identifiers to the outbound logical connection identifiers of the stored affiliations, and to identify the local application having the application identifier affiliated with the outbound logical connection identifier that matches the inbound logical connection identifier. In another particular embodiment of such a source device, the MQ module is further configured to establish the affiliation of the application identifiers and corresponding outbound logical connection identifiers in the memory for each of the outbound messages communicated from the source device.

In accordance with another embodiment of the invention, a system is provided for communicating information between applications over a network. The system includes a source device having a number of source applications (which may include applications, application instances, application processes/threads, etc.) for transmitting messages over the network. The system also includes a destination device having at least one destination application for receiving messages and for providing reply messages in response to the received messages. The source device includes a memory to store affiliations of application identifiers and corresponding outbound logical connection identifiers for each of a plurality of outbound messages communicated from the source device. The source device further includes a source Message Queue (MQ) module configured to compare inbound logical connection identifiers of the reply messages to the outbound logical connection identifiers of the stored affiliations, and to identify the local application having the application identifier affiliated with the outbound logical connection identifier that matches the inbound logical connection identifier.

In more particular embodiments of such a system, the destination device is configured to directly transmit and receive the messages, and does not utilize a local MQ. In another particular embodiment, the destination device includes a destination MQ of a different type than the source MQ.

These and various other advantages and features of novelty which characterize the invention are pointed out with particularity in the claims annexed hereto and form a part hereof. However, for a better understanding of the invention, its advantages, and the objects obtained by its use, reference should be made to the drawings which form a further part hereof, and to accompanying descriptive matter, in which there are illustrated and described representative examples of a system and method in accordance with the invention.

BRIEF DESCRIPTION OF THE DRAWINGS

The invention is described in connection with the embodiments illustrated in the following diagrams.

DETAILED DESCRIPTION OF THE INVENTION

In the following description of the exemplary embodiment, reference is made to the accompanying drawings which form a part hereof, and in which is shown by way of illustration representative embodiments in which the invention may be practiced. It is to be understood that other embodiments may be utilized, as structural and operational changes may be made without departing from the scope of the present invention.

Generally, the present invention provides a system and method for communicating messages between applications where Message Queues (MQs) are implemented for less than all of communicating applications, and/or when MQs associated with the communicating devices do not employ like protocols and/or packet headers. Associations are created between application identifiers and their corresponding transport identifiers (or other logical connection identifiers) that are presented upon sending a message from the device. When a responsive message is sent to that application, the message must be able to locate the application or application instance that sent the first message. In accordance with the present invention, this is accomplished by referring to the previously created associations of application identifiers and transport identifiers. When the transport identifier associated with the inbound message is compared to the transport identifiers of the created associations, a match to one (or more) of the transport identifiers of the created associations may be detected, which in turn supplies the appropriate application identifier for the targeted application.

Figure 1:
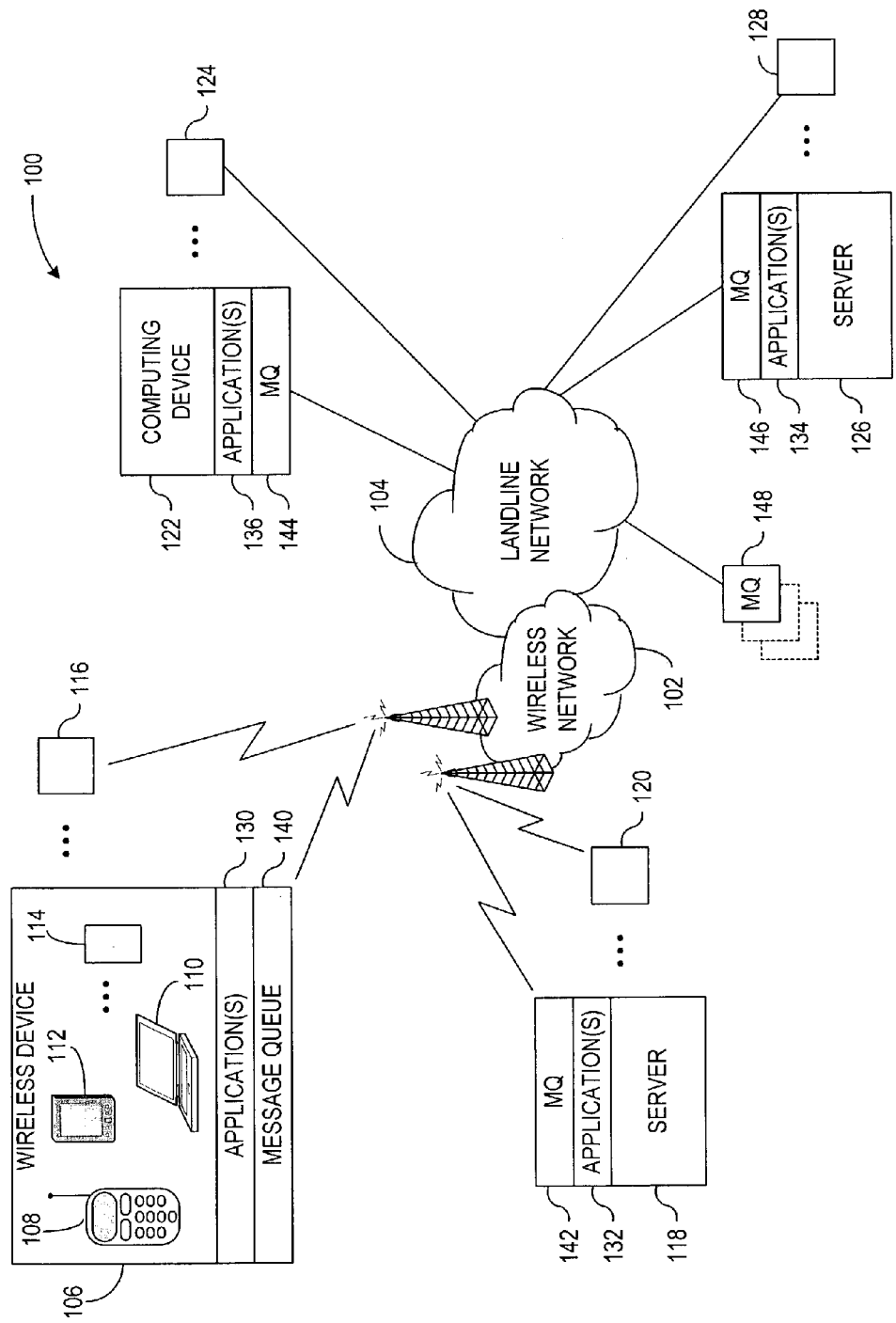
FIG. 1 is a block diagram illustrating an exemplary networking environment in which the principles of the present invention are applicable.

In one embodiment, the present invention involves software architecture in landline and/or mobile communication systems that includes functionality relating to the intercommunication of applications. As previously described, message queuing methodologies are used to facilitate communication between applications. FIG. 1 is a block diagram illustrating an exemplary networking environment 100 in which the principles of the present invention are applicable. The networking environment 100 may include, for example, one or more wireless networks 102 and/or landline networks 104. The wireless network(s) 102 may represent any one or more known or future wireless networking technologies, such as the Global System for Mobile Communications (GSM), Universal Mobile Telecommunications System (UMTS), Personal Communications Service (PCS), Time Division Multiple Access (TDMA), Code Division Multiple Access (CDMA), Wideband CDMA (WCDMA), or other mobile network transmission technology. Other wireless communications means may also couple the various terminals, such as short-range wireless technologies (e.g., Bluetooth). Any wireless device 106 or other communications terminal may be coupled to such wireless network(s) 102, such as mobile phones 108 and other mobile communicators, laptop or other portable computers 110, Personal Digital Assistants (PDA) 112, or any other similar terminal capable of communicating via the wireless network 102, as represented by generic wireless device 114. Any number of wireless devices may be coupled to the wireless network 102, as represented by wireless device-N 116. Other devices or network elements 118, 120 may also be coupled to the wireless network 102. One example of such a network element is a server 118.

Landline network(s) 104 may include a Global Area Network (GAN) such as the Internet, one or more Wide Area Networks (WAN), Local Area Networks (LAN), and the like. Any computing device or other terminal capable of communication may be operable via the landline network 104, such as computers 122, 124 (including desktop, workstations, laptop, conferencing systems, etc.) or any other similar computing device capable of communicating via the network 104. Other devices or network elements 126, 128 may also be coupled to the landline network 104. For example, server 126 may provide content, data, etc. to any one or more other computers 122, 124, wireless devices 106, 116, and/or other servers 118 or other network elements 120, 128. The present invention is applicable with any network element having programs or applications in which communication is desired with other programs/applications. Further, while the present invention is particularly beneficial in networking environments, the present invention is equally applicable to stand-alone systems where communications between applications or application instances occur.

In the illustrated embodiment of FIG. 1, each of the illustrated network elements includes one or more applications that may communicate with other applications in other network elements. For example, the wireless device includes application(s) 130, the servers 118 and 126 include application(s) 132 and 134 respectively, and the computing device 122 includes application(s) 136. Software used to facilitate communication between such applications is often referred to as application communication "middleware."

The present invention is directed to an aspect of such middleware, namely message queues, which facilitate communication between such applications 130, 132, 134, 136, and/or other applications. Application data traversing a network is often referred to as messages. Message queues provide a holding location in the network to temporarily store the messages during transit. Generally, the message queue (MQ) may reside in the computer, server, or other system that is sending the messages, and in the system that is receiving the messages. For example, any of the network elements 106, 118, 122, 126 may include a MQ, such as MQs 140, 142, 144, 146 respectively. Alternatively, MQs may be logically positioned between the sending and receiving systems as an intermediary computing system, as represented by the one or more MQs 148. As is described in greater detail below, the present invention allows applications to communicate with one another using MQs, despite the absence of an MQ in one of the communicating devices or an incompatibility between MQs in the communicating devices.

Figure 2:
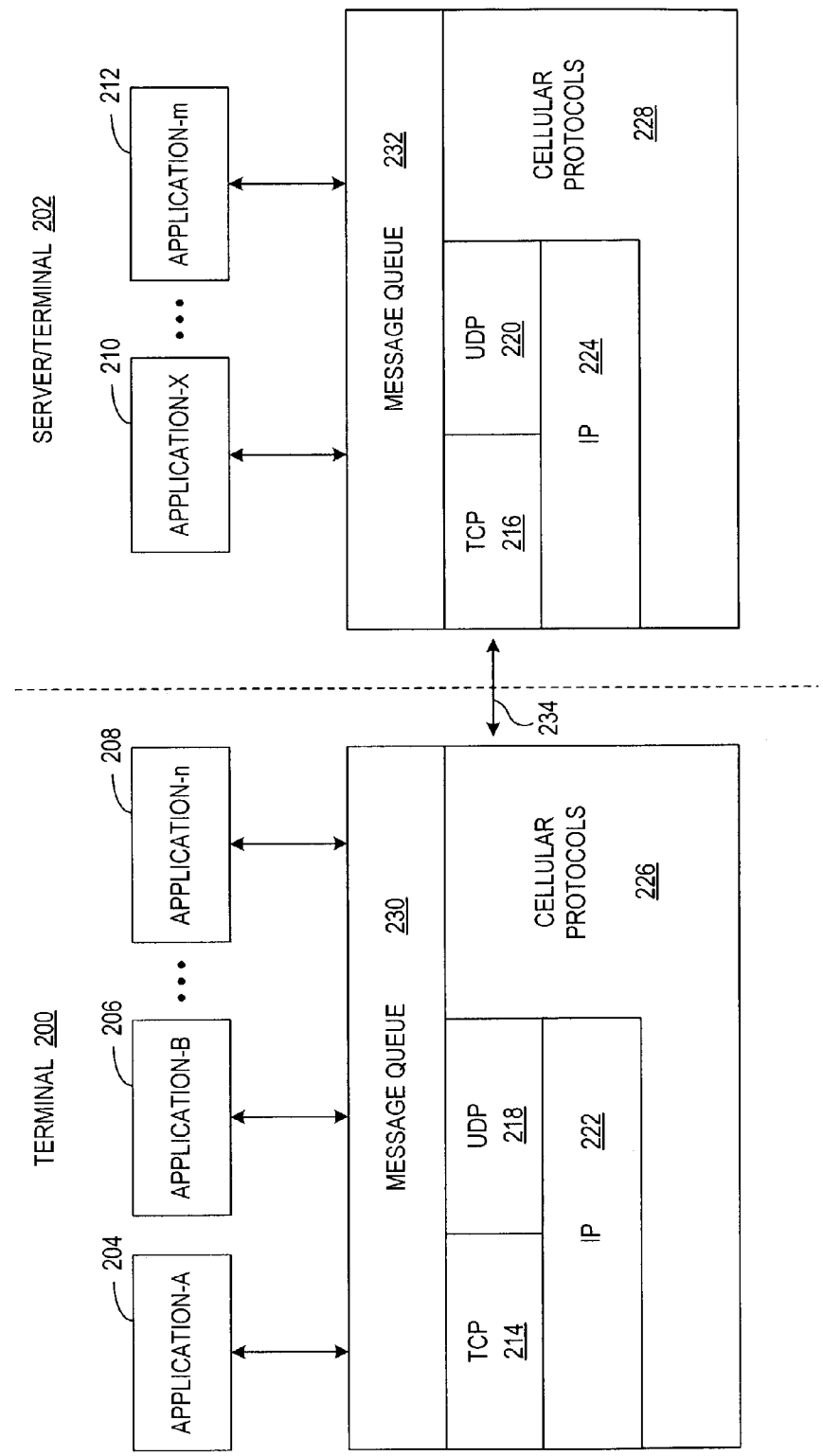
FIG. 2 is a block diagram illustrating a representative example of the architectural placement of the message queue in a layered software architecture.

Wireless and landline network communications are often described in terms of a layered software architecture, roughly based on the Open Systems Interconnection (OSI) reference model which is known in the art. FIG. 2 is a block diagram illustrating a representative example of the architectural placement of the message queue in such a layered software architecture. This embodiment assumes wireless/cellular communication between applications of a wireless terminal 200 and another terminal or server (server/terminal 202). The terminal 200 includes representative applications including application-A 204, application-B 206, through an indeterminate number of applications represented by application-n 208. Similarly, the server/terminal 202 includes representative applications including application-X 210 through an indeterminate number of applications represented by application-m 212 These applications, together with any desired or required Application Programming Interfaces (APIs), represent the application layer of each of the stacks.

The Transmission Control Protocol (TCP) 214, 216 and User Datagram Protocol (UDP) 218, 220 stack services depict representative transport-layer protocols. Typically, either TCP or UDP protocols are used for Mobile Internet devices or landline devices to carry application-related messages. The Internet Protocol (IP) 222, 224 stack services depict a representative network-layer protocol, which has been used to carry the data over IP-based networks. In the illustrated embodiment, various wireless/cellular protocols 226, 228 may represent protocols between the data link layers and transport layers. Such protocols include, for example, Short Messaging Service (SMS), Multimedia Messaging Service (MMS), Wireless Application Protocol (WAP), etc. Architecturally, MQ 230, 232 is positioned between communication protocols and applications in the example shown in FIG. 2. The connection between the terminal 200 and the server/terminal 202, as depicted by communication channel 234, may be an unreliable connection that may only be available sporadically. The MQ 230, 232 addresses this situation. However, as described more fully below, not all devices utilize MQs. Further, even in cases where each of the communicating devices utilize MQs, the MQs may not be compatible in terms of protocols and/or packet headers associated with the communicated information.

When an MQ receives a message from the transport layer (e.g., TCP 214/216; UDP 218/220, etc.), it must know to which application and/or application instance the message is directed. It is not always enough to recognize the application type, since the host (e.g., computer, mobile terminal, etc.) may have several instances of the application software running concurrently. Moreover, the situation becomes more complicated due to the fact that application instances may be temporarily suspended, or even terminated. Thus, the message must be passed to the correct application (including discrete application or application process) or application instance when that application or application instance is activated or reactivated.

Figure 3A:
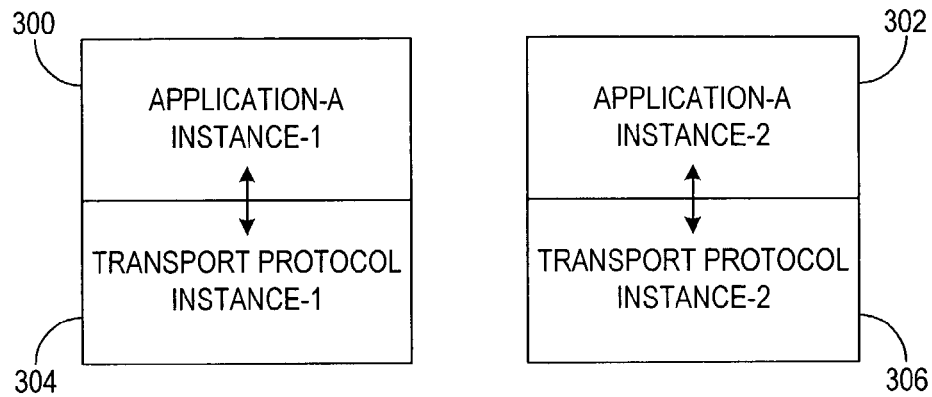
FIG. 3A is a block diagram of an association between application and transport instances where no message queues are utilized.

When MQs are not used, this problem does not occur. This is because the application directly activates and uses the protocol. FIG. 3A depicts this situation, and illustrates a block diagram of a typical case where no MQs are used. In the illustrated example, two instances of application-A are active, namely application-A instance-1 300 and application-A instance-2 302. In this case, each application instance is directly associated with a different transport protocol instance. For example, invoking application-A instance-1 300 will call transport protocol instance-1 304, and invoking application-A instance-2 302 will call transport protocol instance-2 306. In a more particular example using TCP at the transport layer, assume application-A instance-1 300 and instance-2 302 correspond to two browser applications running concurrently. Without the use of MQ, each will open its own TCP socket to send Hypertext Transfer Protocol (HTTP) messages. Therefore, there is a one-to-one relationship between each of the browser instances 300, 302 and the TCP processes 304, 306 respectively.

Figure 3B:
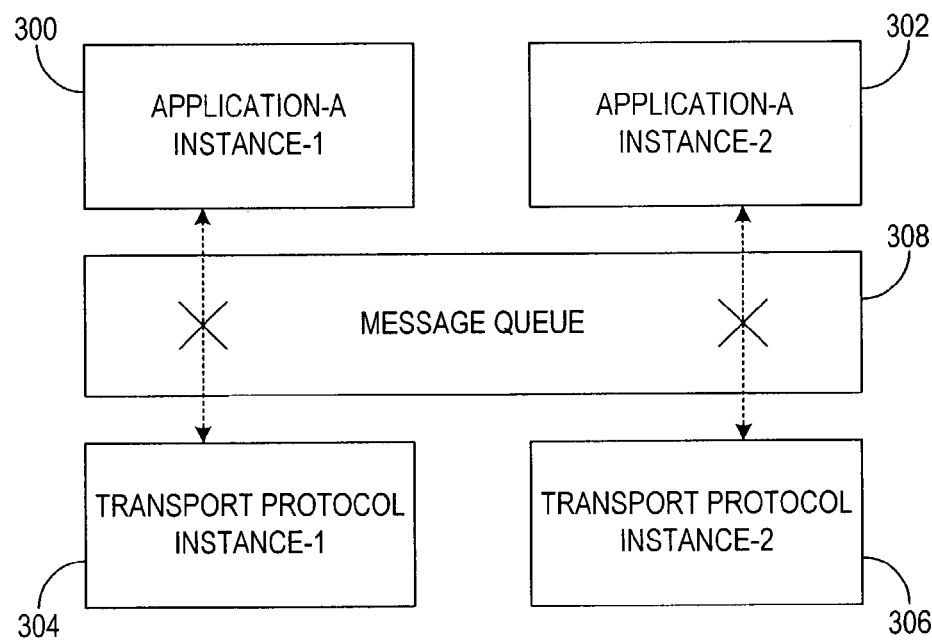
FIG. 3B is a block diagram illustrating the disruption of the traditional association between application and transport instances where message queues are utilized.

Utilization of MQs provides a number of benefits, and thus it is often desirable to utilize MQs. However, the use of MQs disables the traditional association shown in FIG. 3A. This is depicted in FIG. 3B, where an MQ 308 is utilized between the application instances 300, 302 and the transport instances 304, 306. As can be seen, the association between the transport and the application instances is disabled. In a more particular example, again assume application-A instance-1 300 and instance-2 302 correspond to two browser applications running concurrently. Both instances 300, 302 of the browser may send an HTTP request to MQ 308, and then may be suspended or terminated. Meanwhile, the MQ 308 sends the messages forward to the destination. When the destination device (e.g., server) responds, the MQ 308 must know to which of the browser instances 300, 302 the response is directed. Unfortunately, it is possible that the transport uses the same identifier, such as a TCP port number, and the response cannot be directed to the appropriate application instance.

When MQ is used, it is normally assumed that an MQ is used at both ends of the communication, such as at both a client/terminal and a server. This is partly due to the fact that there is a need to uniquely identify the communicating application, including where the application has several instances running and each of the instances can enter a suspended or terminated state. As previously described, the MQ must know to which application and application instance a message received from the transport layer is directed to. It is a straightforward solution to introduce MQ at both ends, and to use a particular protocol or packet header to uniquely identify the communicating applications at both ends. Such a protocol or packet header may need to be proprietary to achieve this goal, but in any event both communication ends must support the same kind of MQ. For example, the sending MQ may add a proprietary MQ header that contains a unique identifier. This is depicted in FIG. 4, which provides a block diagram illustrating a solution using MQ at both ends of the communication.

Figure 4:
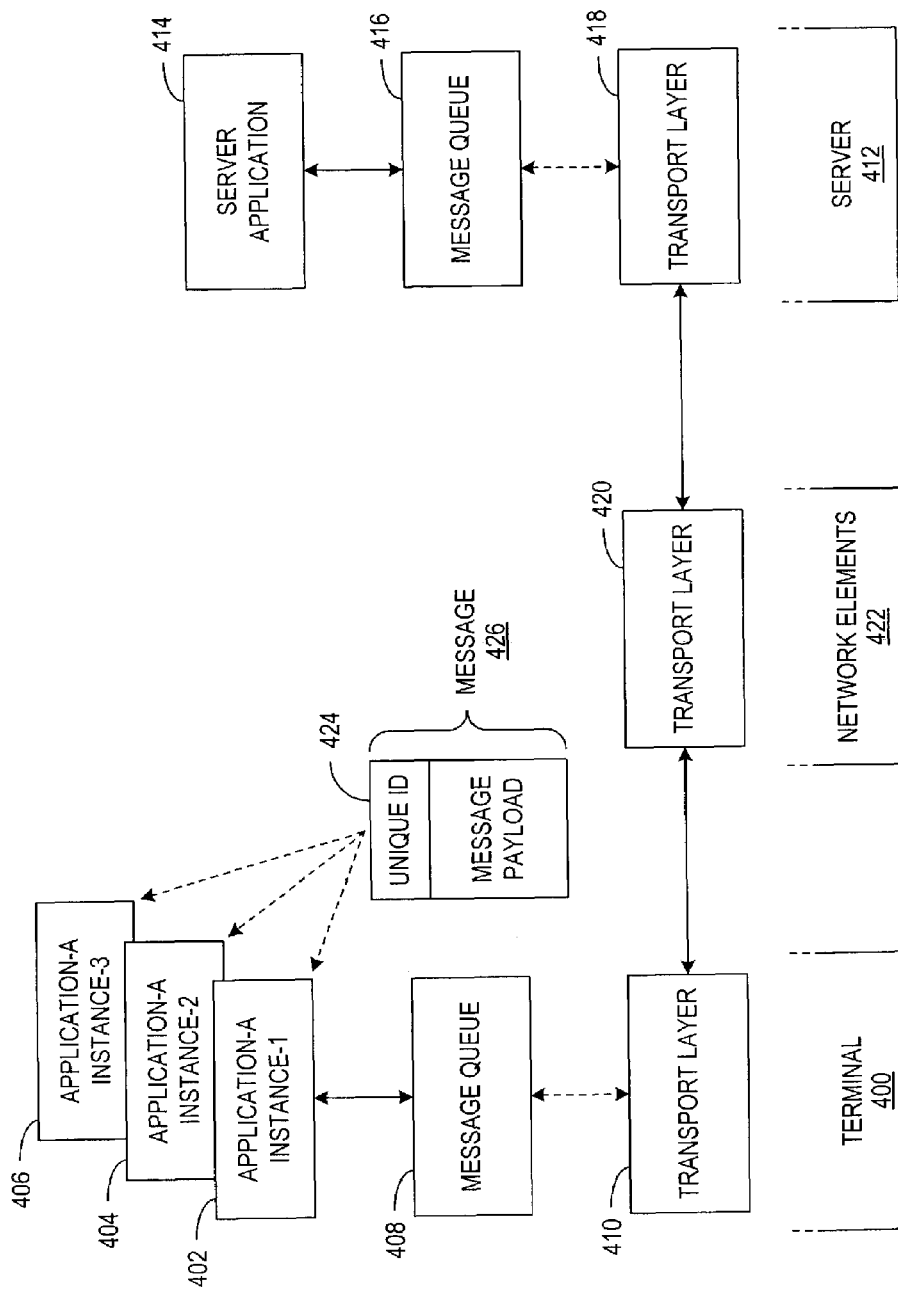
FIG. 4 is a block diagram illustrating one manner of accounting for the disruption described in FIG. 3B, by utilizing message queues at both ends of the communication.

In the example of FIG. 4, three application instances of an application are associated with a terminal 400, including application-A instance-1 402, application-A instance-2 404, and application-A instance-3 406. An MQ 408 is provided at the terminal 400, logically between the application instances and the transport layer 410. The other end of the communication in the illustrated example is a server 412 that includes a server application 414 and an MQ 416 logically between the server application 414 and the transport layer 418. The transport layer 420 may also be present at various network elements 422 along the communication channel. Assume that the server application 414 is to send a message to one of the application instances 402, 404, 406. A unique identifier (ID) 424 is used to uniquely identify the communicating applications. For example, the sending MQ 416 may add a proprietary MQ header to the message 426 that contains the unique ID 424 to identify the receiving application instance. Alternatively, the sending MQ 416 may use some specific and possibly proprietary protocol to identify the destination application instance 402, 404, 406 for the message. Using this unique ID 424 that is communicated with the message 426, the appropriate one of the application instances 402, 404, 406 can be identified.

However, this approach limits the use of MQ only to cases where both communication ends support the same kind of MQ. This naturally leads to fragmentation, and is not desirable from an application developer's point of view. For example, it is possible that the developer must make different versions of the software, or include support for cases where there is, or is not, a MQ at the other end. The present invention overcomes this problem, and overcomes the need to have possibly proprietary protocol and/or packet headers used between the communicating ends for uniquely identifying the communicating peers. The present invention also allows for MQ use even in the case where MQ deployment is at only one side of the end-to-end communication channel.

The present invention provides for storing of an association of application and transport identifiers, to facilitate subsequent identification of the application and/or application instance to which a message(s) is destined. As stated above, this allows for MQ use even in the case of MQ deployment at only one side of the end-to-end communication channel, and eliminates the need for the same kind of MQs at each end of the communication channel where both ends implement MQs. In one embodiment of the invention, the stored correlation of application and transport identifiers is implemented by maintaining a table (hereinafter referred to as an "ID-table") that identifies both the application and the transport related to a specific application. In accordance with the present invention, the particular identifiers used may vary, as any available application and transport identifiers may be used as long as the correlation therebetween is provided. For example, the application/transport association may be provided by associating an application identified using a unique ID provided by the MQ, and a transport identified using the identification of the transport protocol instance. Other application and transport identifiers may be used, as described more fully below. In this manner, when an MQ receives a message from the transport layer, it can access the stored association of application/transport identifiers to determine which application/application instance the message is directed to. Therefore the present invention eliminates the need to have an MQ, or at least the same MQ, at both ends of the communication channel.

Figure 5:
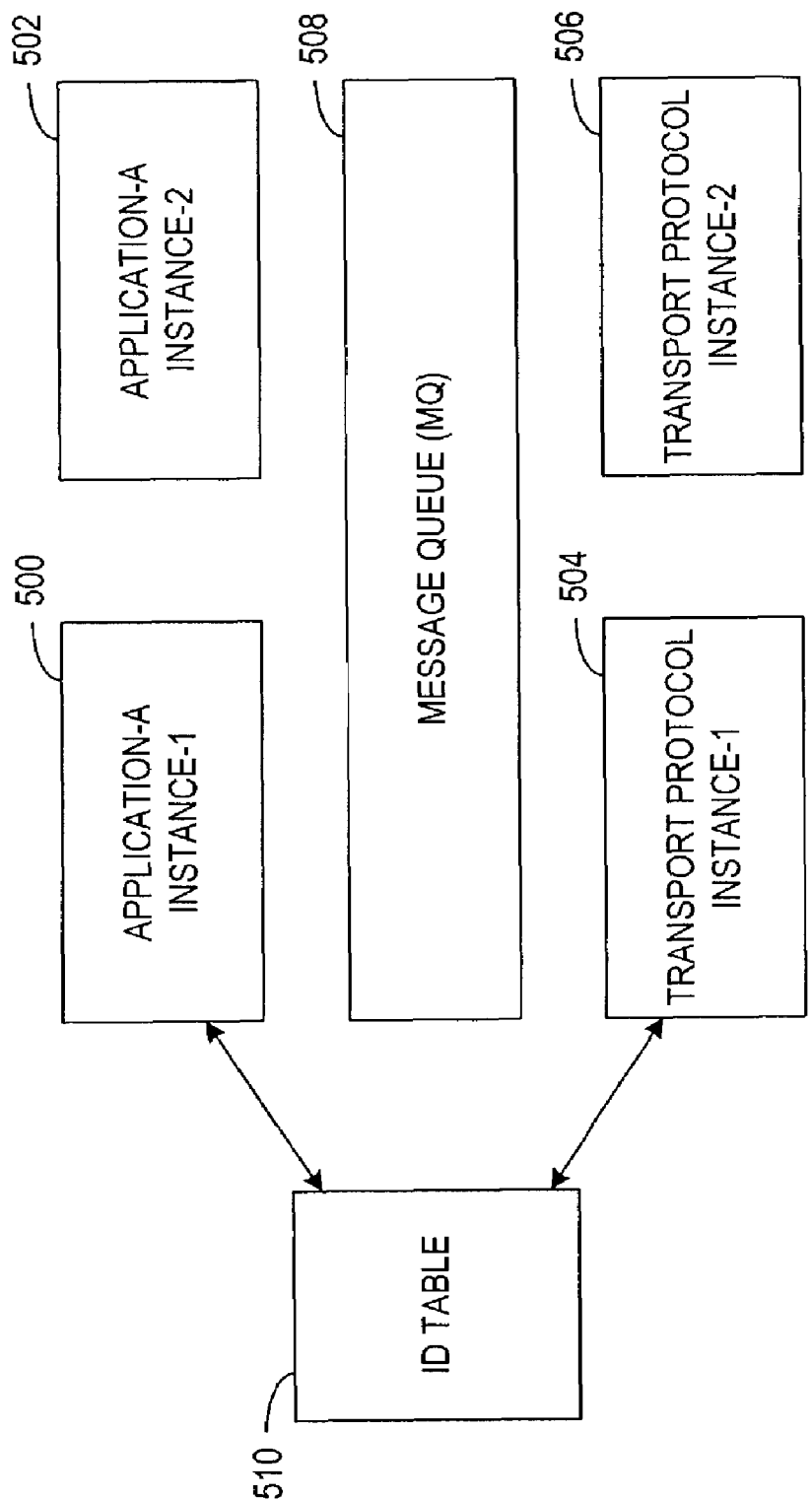
FIG. 5 is a block diagram illustrating one embodiment for providing an association between application and transport identifiers in accordance with the present invention.

FIG. 5 is a block diagram illustrating one embodiment for providing an association between application and transport identifiers in accordance with the present invention. In the embodiment of FIG. 5, two application instances are shown, including application-A instance-1 500 and application-A instance-2 502. Two transport protocol instances are shown, including transport protocol instance-1 504 and transport protocol instance-2 506. An MQ 508 is also utilized to facilitate the dispatch of messages to receiving applications. However, the logical placement of the MQ 508 disrupts any association between the application and transport instances. In accordance with the present invention, an association of the application and transport identifiers for each message transfer is created, which can subsequently be used to identify the appropriate application or application instance when the target of the message (e.g., server, another terminal, etc.) responds to the application or application instance that originally sent the message. In the illustrated embodiment of FIG. 5, the association of the application and transport identifiers is maintained using a local ID-table 510. The ID-table 510 therefore maintains entries of at least application identifiers and transport identifiers that are used when messages are sent, and maintains an association between corresponding application and transport identifiers used in the message transfer.

Figure 6:
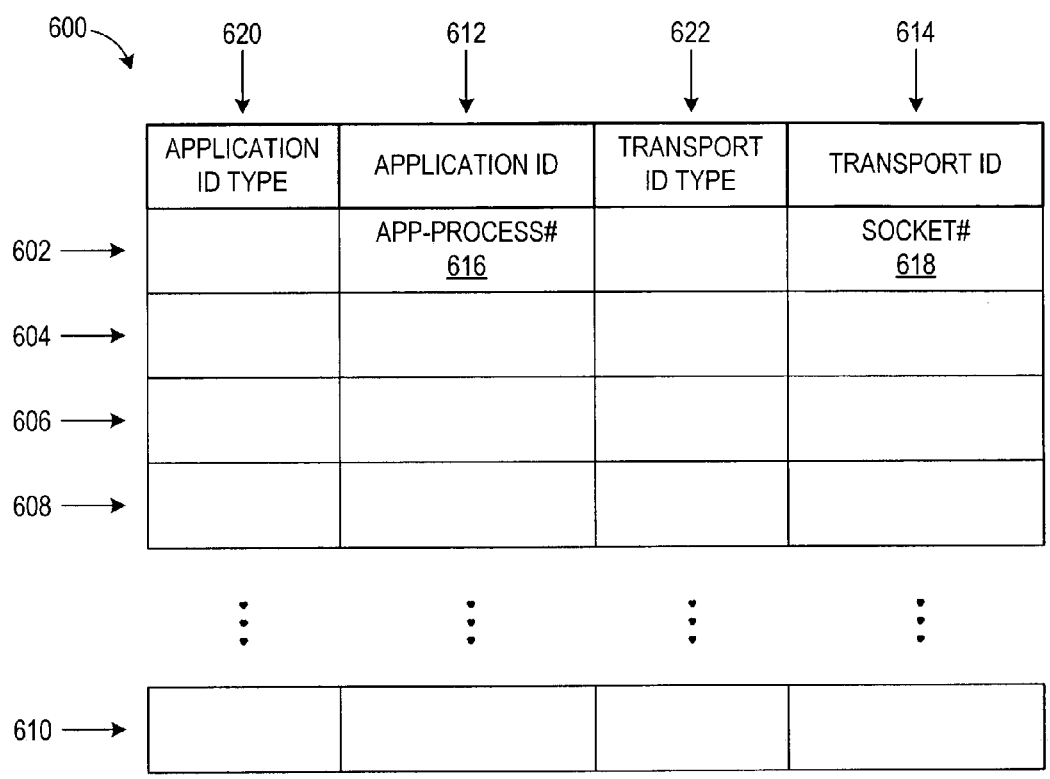
FIG. 6 is a diagram illustrating one embodiment in which the association between application and transport identifiers may be maintained in accordance with the present invention.

FIG. 6 is a diagram illustrating one embodiment in which the association between application and transport identifiers may be maintained. In the illustrated embodiment, an ID-table 600 is implemented. ID-table 600 includes one or more table entries, depicted as entries 602, 604, 606, 608, through an indeterminate number of entries depicted by entry 610. In one embodiment of such an ID-table 600, only an association between an application ID 612 and a transport ID 614 is maintained. For the application ID 612, the MQ generates a unique identifier for the application or application instance, or uses another available identifier such as the process number of the application process if supported by the operating system. For the transport ID 614, the MQ uses any available transport identifier, such as the process number of the transport protocol process if supported by the operating system, or a socket number if provided by the transport layer, etc. For a particular message, an entry is thus created in the ID-table 600 using the application ID 612 and transport ID 614. For example, entry 602 may include an association of an application ID 612 depicted as APP-PROCESS# 616 and a transport ID 614 depicted as SOCKET# 618. This association of identifiers 614, 618 is maintained, and used for subsequent identification of the appropriate application/application instance in which a responsive message is directed.

The MQ therefore maintains a table 600 that connects the particular application to the particular transport. In one embodiment, the table is constructed in such a way that it is as independent of the features of the operating system as possible. When a message is sent, the MQ provides a unique ID 612 for the application locally, and this unique ID is stored to the table. The unique ID may be generated by the MQ, may be a process identifier if the MQ has one available (e.g., APP-PROCESS# 616), or may be another unique identifier of the application. The corresponding transport ID 614 is also stored to the table 600, and may be obtained using the transport-specific identifier such as a TCP or UDP socket number, or a process or thread, depending on what is supported by the environment.

In one embodiment of the invention, the ID-table 600 (or other data structure) also contains information about the nature of the identifiers used. For example, an application ID type 620 and/or a transport ID type 622 may be included with one, more, or all of the entries of the table 600. For example, the application ID type may be a unique ID generated by the MQ, a process number, or other similar indicator. Analogously, the transport ID type 622 may be a socket number, port number, session identifier, process number, thread number, or other similar indicator. As an example, some types of operating systems return TCP socket numbers that uniquely identify the TCP process. This TCP socket number can be used as the transport ID 614, and the transport ID type 622 may then be a socket number or more specifically a TCP socket number. Depending on the operating system, it is also possible that the MQ may get some other identifier relating to the transport, such as an identifier of the transport process/thread itself, rather than a socket number.

Additional and/or different fields other than those depicted in FIG. 6 may be associated with the ID-table 600. Further, the association of such identifiers need not be in a "table" per se. Rather, any data structure or linking feature capable of maintaining such an association between the pertinent identifiers may be used in accordance with the present invention. For example, links, pointers, linked lists, arrays, and the like may be used to establish the required association between the application identifiers and the logical connection identifiers (e.g., transport identifiers).

Figure 7:
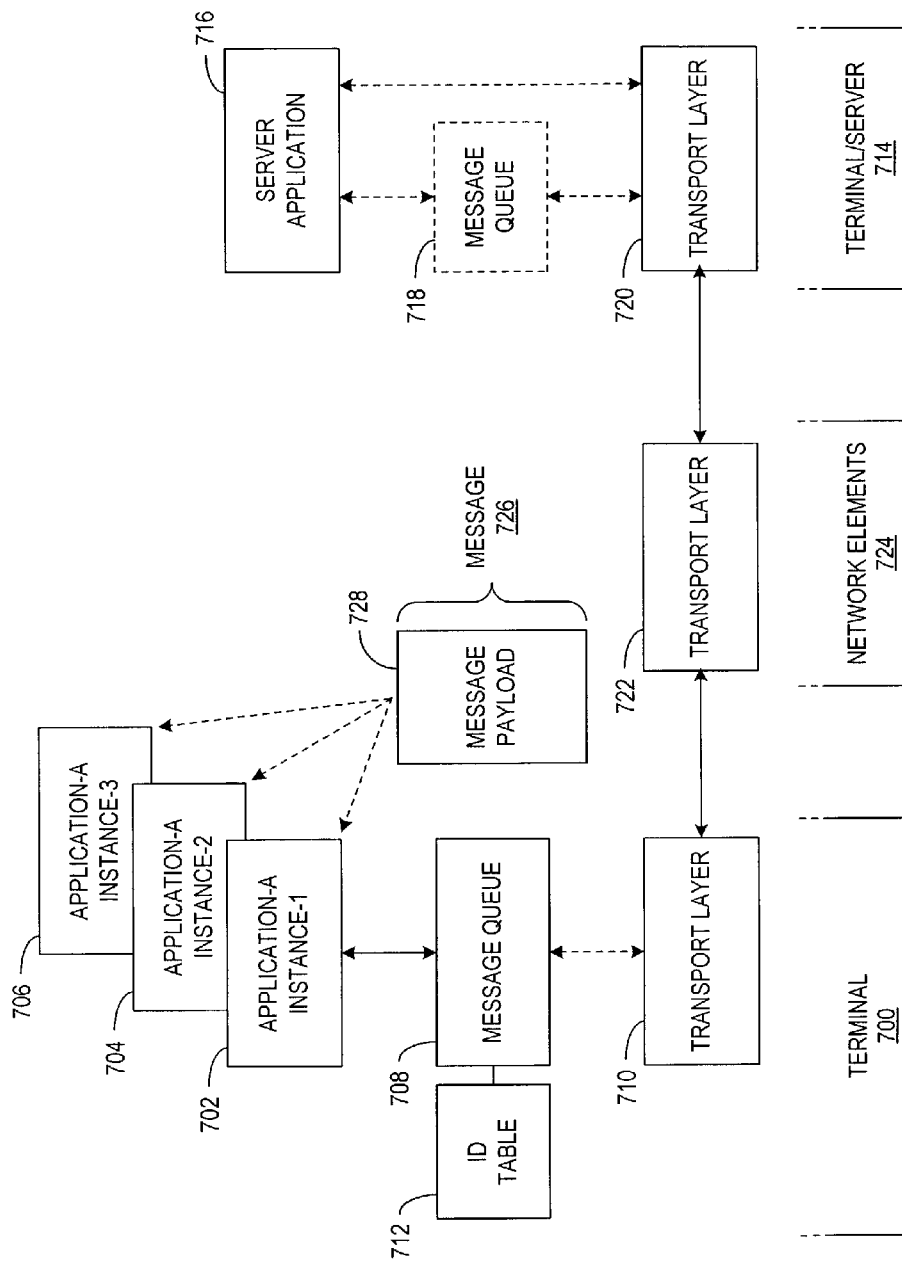
FIG. 7 is a block diagram illustrating one embodiment of a manner of implementing an ID-table where only one of the communicating parties utilizes an MQ.

FIG. 7 is a block diagram illustrating one embodiment of a manner of implementing an ID-table where only one of the communicating parties utilizes an MQ. In the example of FIG. 7, three application instances of an application are associated with a terminal 700, including application-A instance-1 702, application-A instance-2 704, and application-A instance-3 706. An MQ 708 is provided at the terminal 700, logically between the application instances and the transport layer 710. Associated with the MQ 708 is the ID-table 712, which stores associations of application and transport identifiers as previously described. The other end of the communication in the illustrated example includes another communicating device, which is a server 714 in the present example. The server 714 includes a server application 716, and optionally includes an MQ 718 logically between the server application 716 and the transport layer 720. The transport layer 722 may also be present at various network elements 724 along the communication channel.

In operation, an application or application instance such as application-A instance-1 702 may call for the services of the MQ 708. When doing so, the application instance 702 identifies the destination. The MQ 708 returns a unique identifier to the application instance 702 that may be used in the future. The MQ 708 initializes a transport, such as a TCP socket, UDP socket, etc. The operating system or the transport 710 generally returns some type of identifier related to the transport channel, whether this be a socket number, process or thread identifier, etc. For example, UNIX-type operating systems generally return a TCP socket number that uniquely identifies the TCP process. In other embodiments, the identifier may be associated with the transport process itself.

The MQ 708 then writes both the application number (e.g., "ID_application") and the transport identifier (e.g., "ID_transport") to the ID-table 712. As previously described, it may also be necessary or beneficial to include information pertaining to the nature of the identifier, such as a transport type to indicate whether the transport is identified using a socket number or a process number. The table 712 is maintained until the application 702 indicates its final termination, or some predefined time period has expired without usage, or some other predetermined event occurs.

When a message 726 arrives from the server application 716, it may not utilize the services of an MQ 718. Alternatively, the server 714 may utilize the MQ 718, but may not be of the same kind as the MQ 708, and any particular protocol or packet headers used by MQ 718 may not be of use to the MQ 708. In the illustrated example, the message 726 does not include any particular or proprietary header to direct the message payload 728 (and standard header) to the appropriate one of the application instances 702, and thus may not have utilized the services of an MQ. 718.

When the message 726 arrives from the other communication end point (with or without MQ), the MQ 708 determines from which socket or process the message is received. The MQ 708 then consults the ID-table 712, and compares the socket in which the message was received to the transport identifiers in the ID-table 712. Upon locating a matching socket in the ID-table 712, the associated application process/instance can be determined. In the example of FIG. 7, the associated application instance would identify application-A instance-1 702. The message is then forwarded to the appropriate application instance, or alternatively stored to a queue associated with the MQ 708 (e.g., when the application instance is suspended).

Figure 8:
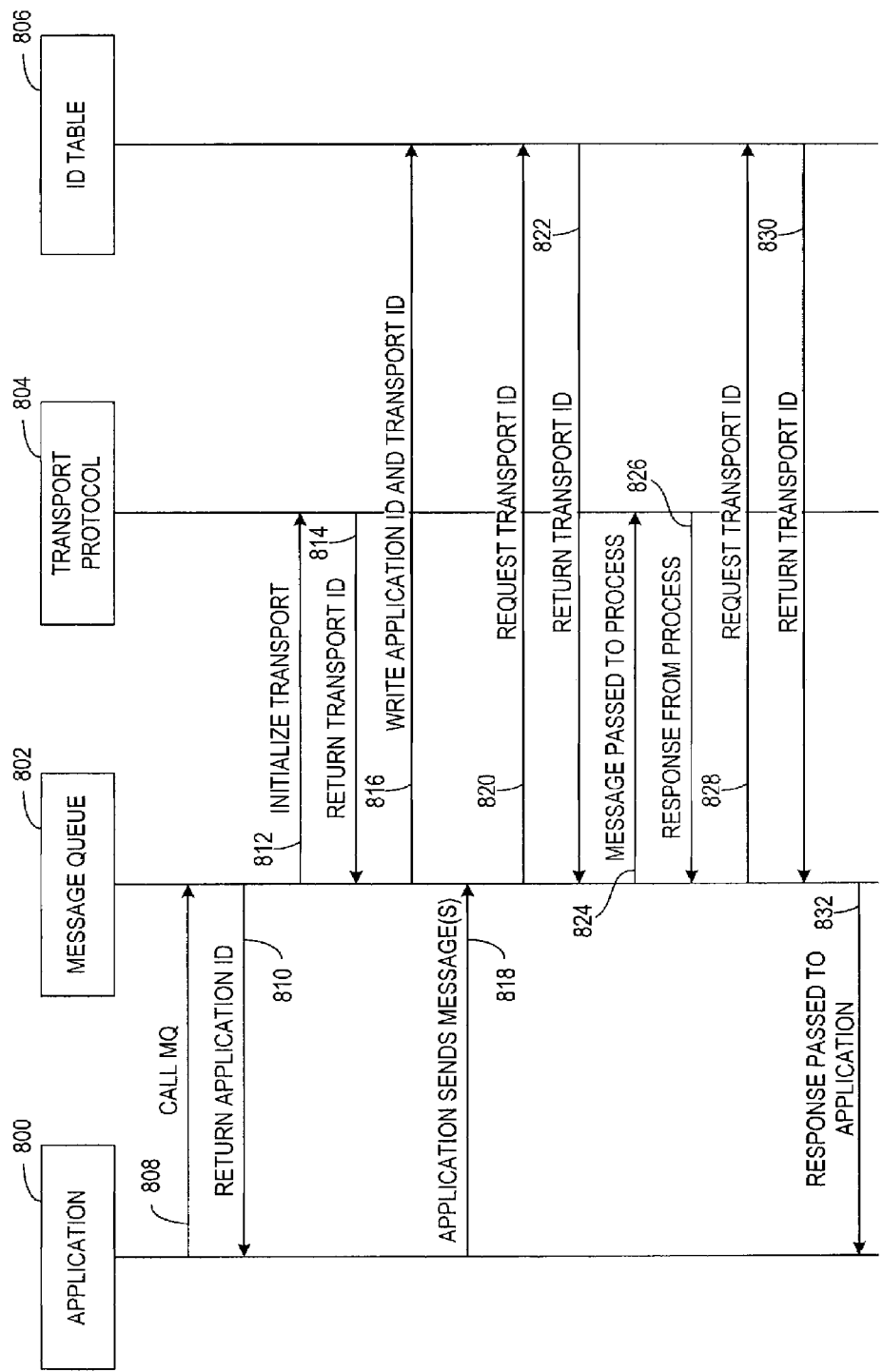
FIG. 8 is a message flow diagram illustrating one embodiment of a manner in which messages may be communicated in accordance with the present invention.

FIG. 8 is a message flow diagram illustrating one embodiment of a manner in which messages may be communicated in accordance with the present invention. This embodiment describes communications from the perspective of a device (e.g., mobile terminal for purposes of FIG. 8), that may initiate communications to another device (e.g., server for purposes of FIG. 8) and receive messages from that server. Thus, the modules of the mobile terminal include the application process/instance 800, Message Queue (MQ) 802, transport protocol process/instance 804, and the data structure 806 used to correlate the application IDs and transport IDs. In the illustrated embodiment, the data structure used is an ID-table 806.

The message flow of FIG. 8 includes the application 800 making a call 808 for the services of the MQ 802. When making this call, the application identifies the destination of the message. More particularly, the application 800 may call the MQ through an Application Programming Interface (API), and identify the target host, application, and perhaps the protocol. It is also possible that the application proposes the unique identifier to be used. The MQ 802 returns 810 a unique application ID to the application 800. If the application has proposed an ID in the first place, then the MQ can check that it is unique before returning it. The MQ 802 also initializes 812 a transport, which results in the transport 804 returning 814 a transport ID. In one embodiment, this involves the MQ 802 making a decision regarding the protocol, and forking a process. In response, the process number, socket number, or the like is returned. The MQ 802, now having both the application ID and the transport ID, writes 816 this information to the ID-table 806 or stores the application ID/transport ID association in another manner. The application 800 sends 818 the message(s) to the MQ 802. The MQ 802 may request 820 the transport ID from the ID-table 806, and the ID-table 806 then returns 822 the transport ID to the MQ 802 to facilitate passing 824 the message(s) to the transport process. Alternatively, the MQ 802 may already have the transport ID from the earlier return 814 of the transport ID, in which case the additional request 820 and return 822 is not required.

The ID-table 806 is now equipped with the association of the application ID and the transport ID of the message(s) sent via the application 800. When a response message is received 826 from the other communication end point, the MQ 802 can determine from which socket/process the message was received. The MQ 802 requests 828 the transport ID from the ID-table 806, and the ID-table 806 then returns 830 the transport ID to the MQ 802. Using the discovered socket/process, and the returned transport ID (i.e., also a socket, process, etc.), the MQ 802 can pass 832 the response message to the appropriate application process/instance 800.

Figure 9:
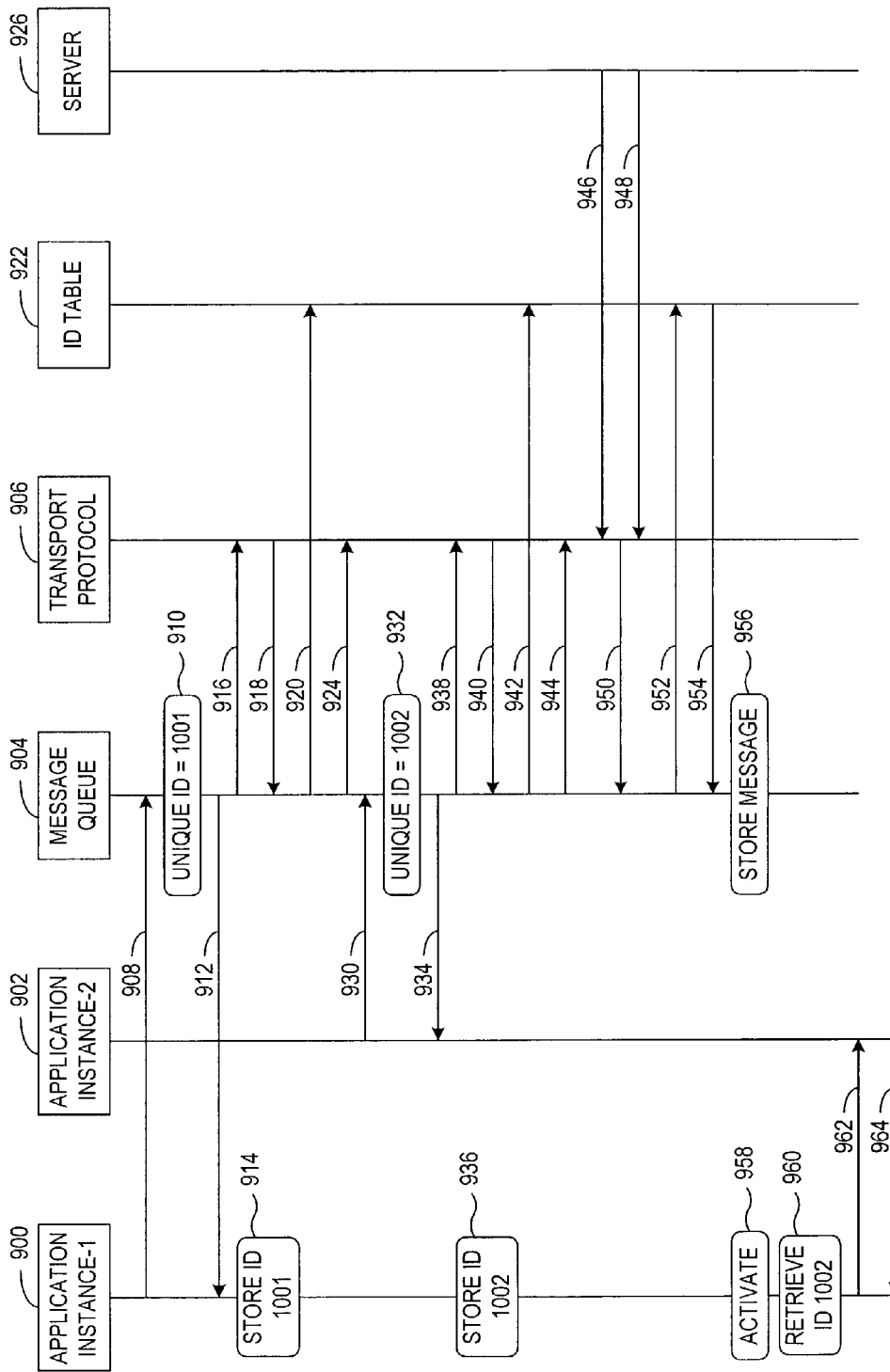
FIG. 9 is a message flow diagram illustrating a manner in which messages to/from multiple application instances may be communicated in accordance with one embodiment of the present invention.

FIG. 9 is a message flow diagram illustrating a manner in which messages to/from multiple application instances may be communicated in accordance with one embodiment of the present invention. For purposes of the description of FIG. 9, assume the existence of two instances of a terminal application, application instance-1 900 and application instance-2 902, and assume that these application instances use proprietary messages between the terminal and the server. The application instances can represent multiple instances of any type of application, such as bookkeeping software. In this particular example, the transport protocol 906 may be UDP, and the application always assumes UDP port number "1234." The terminal user thus has two instances of the application running concurrently, and MQ 904 is used at the terminal.

Application instance-1 900 sends 908 a message to MQ 904 with a function call. An example of such a message call is shown in Example 1 below:

send_message(udp, 102.233.242.202, 1234, message)

Example 1

The MQ 904 receives the function call, provides 910 a unique ID "1001," and returns 912 this value to application instance-1 900. Application instance-1 900 then stores 914 the ID "1001," such as storing the ID to disk, and goes to a suspend state. The MQ 904 calls 916 a UDP socket to IP host "102.233.242.202" and to UDP port "1234" and receives 918 a UDP socket number "111." The MQ 904 stores 920 a new entry to the ID-table 922. An example of such an entry is shown in Table 1 below:

TABLE 1

| applicationID_type | applicationID | transportID_type | transportID |
|---|---|---|---|
| own_ID | 1001 | socketNumber | 111 |

The MQ 904 sends 924 the message to the UDP socket to be communicated to the server 926.

Similar steps are repeated for the second application instance-2 902. More particularly, application instance-2 902 sends 930 a message to MQ 904 with a function call. An example of such a message call is shown in Example 2 below:

send_message(udp, 102.233.242.202, 1234, message)

Example 2

As can be seen, the message call sent by application instance-2 902 is the same as the message call sent by application instance-1 900. The MQ 904 receives the function call, provides 932 a unique ID "1002," and returns 934 this value to application instance-2 902. Application instance-2 902 then stores 936 the ID "1002," and goes to a suspend state. The MQ 904 calls 938 a UDP socket to IP host "102.233.242.202" and to UDP port "1234" and receives 940 a UDP socket number "112." The MQ 904 stores 942 a new entry to the ID-table 922. An example of such an entry is shown in Table 2 below:

TABLE 2

| applicationID_type | applicationID | transportID_type | transportID |
|---|---|---|---|
| own_ID | 1002 | socketNumber | 112 |

The MQ 904 sends 944 the message to the UDP socket to be communicated to the server 926.

The server 926 receives the messages from both application instances 900, 902 and processes the responses. The server 926 sends the responses back to the terminal, as depicted on paths 946, 948. It should be noted that the responses may be sent back in any order, and need not be sent back in the order in which they were received. MQ 904 receives 950 a message from the UDP socket 111. The ID-table 922 is consulted as depicted on paths 952, 954, and the MQ 904 determines that the message is related to the application having unique ID of "1001." The MQ 904 stores 956 the message with the application ID number. The user activates 958 the application instance-1 900. The application retrieves 960 the application ID from the disk, and checks 962 the MQ 904 for possible messages, such as using a "get_message(1001)" function call. The MQ 904 receives the request, and returns 964 the message. In an analogous fashion, application instance-2 902 can retrieve its message from the MQ 904, using UDP socket 112 and the unique ID of "1002."

The present invention is also applicable in connection with different protocols and different software architecture layers. For example, while transport identifier has been described herein for purposes of facilitating an understanding of the invention, the present invention is applicable to other logical connection identifiers, depending on the architectural layer at which the messages are being communicated. The present invention is equally applicable to message transfers originating at another layer, such as the presentation layer, session layer, network layer, etc. Therefore, the present invention provides for the association of process identifiers and logical connection identifiers to ultimately locate and direct responsive messages back to the process, even where that process is not operating at the application layer, or where the logical connection identifier is at the transport layer.

Figure 10:
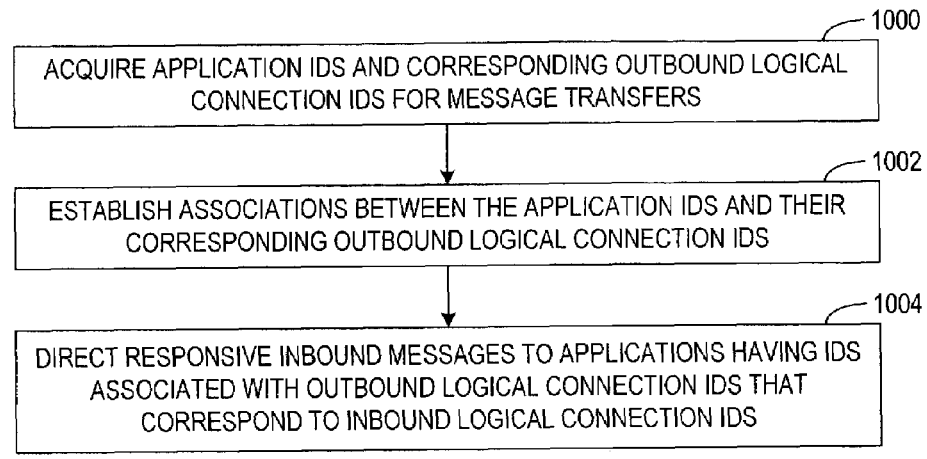
FIG. 10 is a flow diagram of a method for facilitating communication of messages between applications in accordance with one embodiment of the present invention.

FIG. 10 is a flow diagram of a method for facilitating communication of messages between applications in accordance with one embodiment of the present invention. Application IDs and corresponding outbound logical connection IDs, such as transport IDs, are acquired 1000. The outbound logical connection ID thus corresponds to the socket, port, session, etc. in which the outbound message will be sent. The logical connection IDs are associated with message transfers from applications identifiable by their respective application IDs. Associations between the application IDs and their corresponding outbound logical connection IDs are then established 1002. For example, the association may be established by entering the associated application IDs and connection IDs in an ID-table. Inbound messages that are responsive to messages sent by the applications are directed 1004 to the application that has an application ID associated with outbound logical connection ID that corresponds to the inbound logical connection ID. For example, a message received from another device (e.g., server) is directed to the application that has an application ID linked to the outbound transport ID in the ID-table which matches the inbound transport ID. In accordance with one embodiment of the invention, these operations are carried out at least in part by the MQ.

Figure 11:
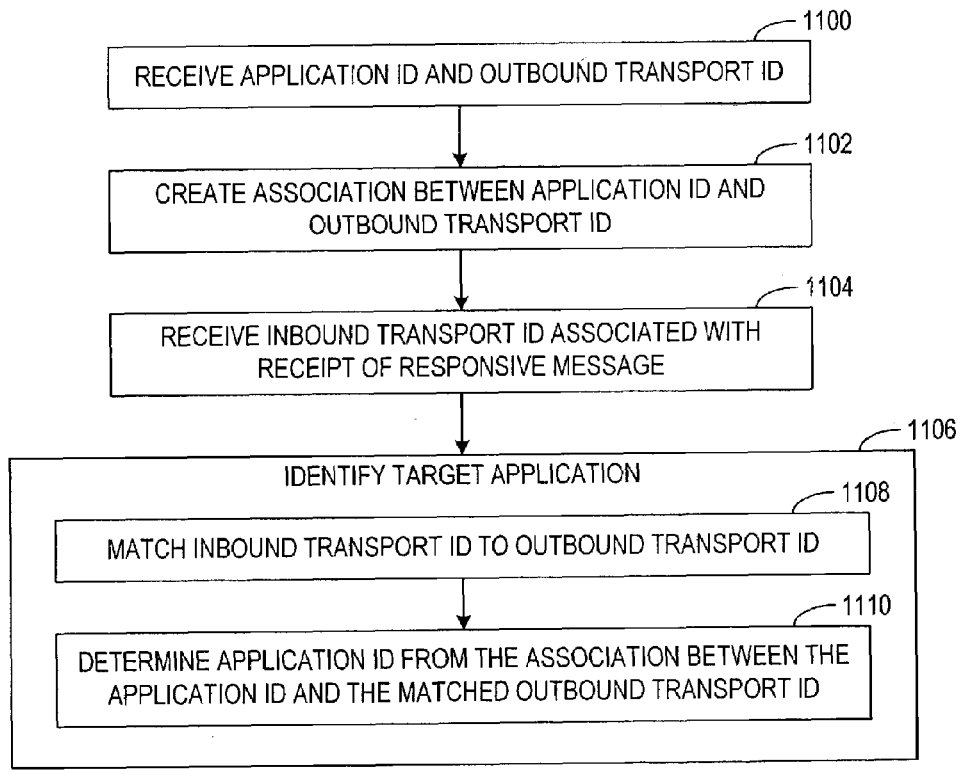
FIG. 11 is a flow diagram of a method for identifying an application among a plurality of applications that is the target of a responsive message.

FIG. 11 is a flow diagram of a method for identifying an application among a plurality of applications that is the target of a responsive message. An application identifier and outbound transport ID is received 1100. In this respect, receipt of the application ID may involve generation of a unique ID at the MQ, or alternatively may involve receiving a unique ID available to the MQ, such as a process number. An association between the application ID and the outbound transport ID is created 1102, in any manner previously described. The inbound transport ID associated with an incoming message is received 1104. The target application is identified 1106 using the previously created association of the application identifier and the outbound transport IDs. For example, the inbound transport ID is matched 1108 to an outbound transport ID in an ID-table, and from this association, the application ID can be determined 1110.

Figure 12:
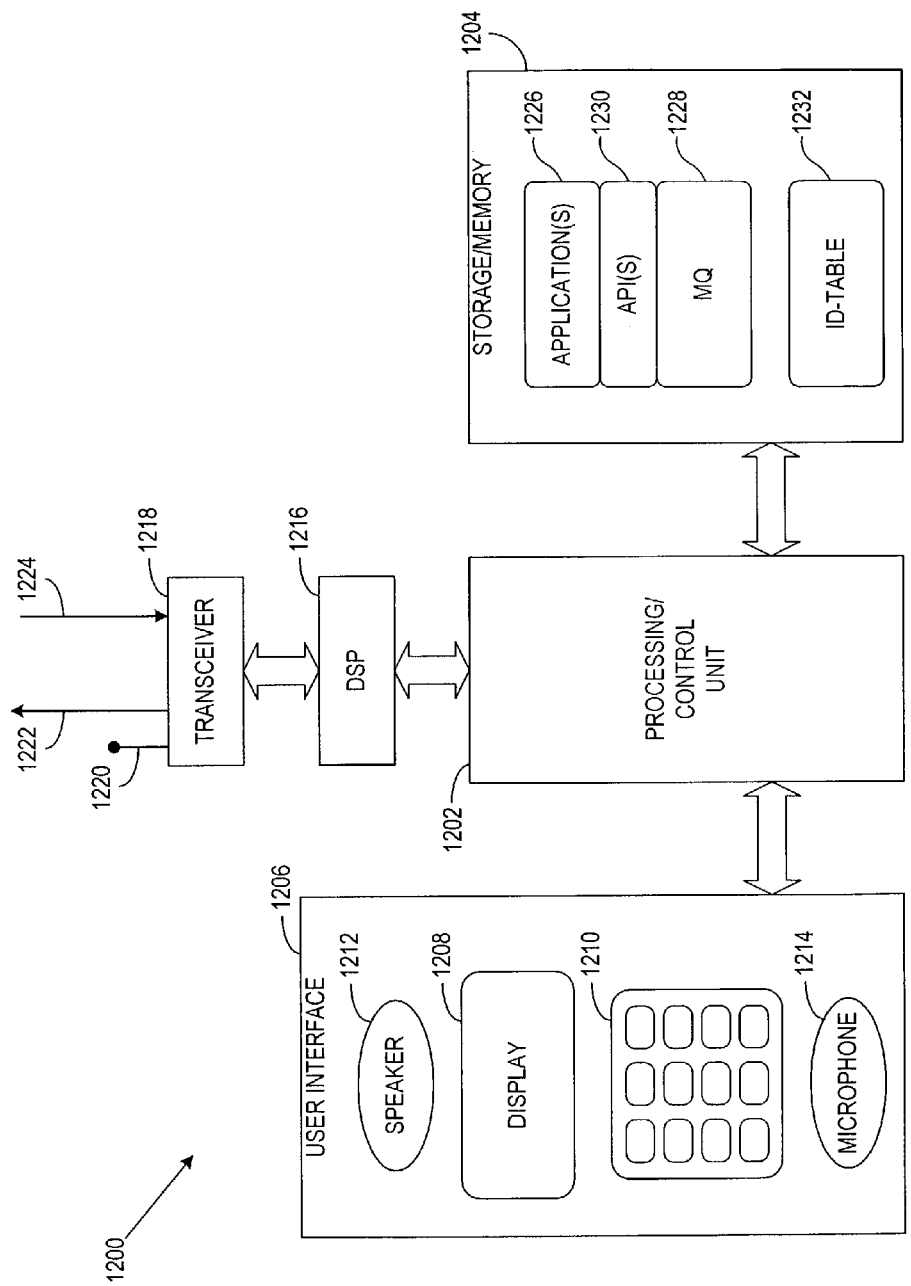
FIG. 12 illustrates a representative mobile terminal computing system capable of carrying out operations in accordance with the invention.

The present invention may be used to communicate messages to/from applications in any type of device that can communicate with the network or other connection. Such devices include computing devices such as desktop computers, workstations, laptop computers, or any other computing system capable of accessing information via a network. Such computing devices also include network servers, such as content servers, storage servers, Multimedia Messaging Service Centers (MMSC) for Multimedia Messaging Service (MMS), Short Message Service Centers (SMSC) for Short Message Service (SMS), or any other network element capable of communicating With other systems and devices over a network, such as the Internet. These devices also include mobile devices, where network access is accomplished via a wireless network that may or may not ultimately be coupled to a landline network. These mobile devices may be any type of wireless device, such as wireless/cellular telephones, personal digital assistants (PDAs), or other wireless handsets, as well as portable computing devices capable of wireless communication. These landline and mobile devices utilize computing circuitry and software to control and manage the conventional device activity as well as the functionality provided by the present invention. Hardware, firmware, software or a combination thereof may be used to perform the various MQ and linking operations described herein. An example of a representative mobile terminal computing system capable of carrying out operations in accordance with the invention is illustrated in FIG. 12. Those skilled in the art will appreciate that the exemplary mobile computing environment 1200 is merely representative of general functions that may be associated with such mobile devices, and also that landline computing systems similarly include computing circuitry to perform such operations.

The exemplary mobile computing arrangement 1200 suitable for performing the MQ functions in accordance with the present invention may be associated with a number of different types of wireless devices. The representative mobile computing arrangement 1200 includes a processing/control unit 1202, such as a microprocessor, reduced instruction set computer (RISC), or other central processing module. The processing unit 1202 need not be a single device, and may include one or more processors. For example, the processing unit may include a master processor and associated slave processors coupled to communicate with the master processor.

The processing unit 1202 controls the basic functions of the mobile terminal as dictated by programs available in the program storage/memory 1204. Thus, the processing unit 1202 is capable of executing the MQ linking and application process/instance identification functions associated with the present invention. More particularly, the program storage/memory 1204 may include an operating system and program modules for carrying out functions and applications on the mobile terminal. For example, the program storage may include one or more of read-only memory (ROM), flash ROM, programmable and/or erasable ROM, random access memory (RAM), subscriber interface module (SIM), wireless interface module (WIM), smart card, or other removable memory device, etc. In one embodiment of the invention, the program modules associated with the storage/memory 1204 are stored in non-volatile electrically-erasable, programmable ROM (EEPROM), flash ROM, etc. so that the information is not lost upon power down of the mobile terminal. The relevant software for carrying out conventional mobile terminal operations and operations in accordance with the present invention may also be transmitted to the mobile computing arrangement 1200 via data signals, such as being downloaded electronically via one or more networks, such as the Internet and an intermediate wireless network(s).

The processor 1202 is also coupled to user-interface 1206 elements associated with the mobile terminal. The user-interface 1206 of the mobile terminal may include, for example, a display 1208 such as a liquid crystal display, a keypad 1210, speaker 1212, and microphone 1214. These and other user-interface components are coupled to the processor 1202 as is known in the art. Other user-interface mechanisms may be employed, such as voice commands, switches, touch pad/screen, graphical user interface using a pointing device, trackball, joystick, or any other user interface mechanism. The mobile computing arrangement 1200 also includes conventional circuitry for performing wireless transmissions. A digital signal processor (DSP) 1216 may be employed to perform a variety of functions, including analog-to-digital (A/D) conversion, digital-to-analog (D/A) conversion, speech coding/decoding, encryption/decryption, error detection and correction, bit stream translation, filtering, etc. The transceiver 1218, generally coupled to an antenna 1220, transmits the outgoing radio signals 1222 and receives the incoming radio signals 1224 associated with the wireless device.

In accordance with the present invention, the MQ functionality may be implemented in, for example, operating systems or software architectures. For example, the processor 1202 can provide the MQ functionality under the direction of program modules stored in the program storage/memory 1204. Applications 1226 and the MQ 1228 programs may be stored in the storage/memory 1204. An Application Programming Interface (API) 1230 may be used to facilitate the transfer of messages between the MQ 1228 and applications 1226. The program storage/memory 1204 can also store the created associations of application IDs and transport IDs, such as depicted by the ID-table 1232.

The mobile computing arrangement 1200 of FIG. 12 is provided as a representative example of a computing environment in which the principles of the present invention may be applied. From the description provided herein, those skilled in the art will appreciate that the present invention is equally applicable in a variety of other currently known and future mobile and landline computing environments. For example, desktop computing devices similarly include a processor, memory, a user interface, and data communication circuitry. Thus, the present invention is applicable in any known computing structure where data may be communicated via a network.

Using the description provided herein, the invention may be implemented as a machine, process, or article of manufacture by using standard programming and/or engineering techniques to produce programming software, firmware, hardware or any combination thereof. Any resulting program(s), having computer-readable program code, may be embodied on one or more computer-usable media, such as disks, optical disks, removable memory devices, semiconductor memories such as RAM, ROM, PROMS, etc. Articles of manufacture encompassing code to carry out functions associated with the present invention are intended to encompass a computer program that exists permanently or temporarily on any computer-usable medium or in any transmitting medium which transmits such a program. Transmitting mediums include, but are not limited to, transmissions via wireless/radio wave communication networks, the Internet, intranets, telephone/modem-based network communication, hard-wired/cabled communication network, satellite communication, and other stationary or mobile network systems/communication links. From the description provided herein, those skilled in the art will be readily able to combine software created as described with appropriate general purpose or special purpose computer hardware to create a system and method in accordance with the present invention.

The foregoing description of the exemplary embodiment of the invention has been presented for the purposes of illustration and description. It is not intended to be exhaustive or to limit the invention to the precise form disclosed. Many modifications and variations are possible in light of the above teaching. Thus, it is intended that the scope of the invention be limited not with this detailed description, but rather determined from the claims appended hereto.

What is claimed is:

1. A processor-implemented method comprising:

acquiring application identifiers and corresponding outbound logical connection identifiers associated with message transfers from applications of a device via a middleware component that passes messages between the applications and a network transport layer of the device, wherein instances of the applications transferring messages are uniquely identifiable by their respective application identifiers, wherein the messages transfers are targeted to a destination network device that does not use a compatible middleware component for processing the message transfers;

establishing associations between the application identifiers and their corresponding outbound logical connection identifiers; and directing, via the middleware component, responsive inbound messages received from the destination network device to the instances of the applications having application identifiers associated with the outbound logical connection identifiers that correspond to inbound logical connection identifiers of the responsive inbound messages.

2. The method of claim 1, further comprising:

comparing the inbound logical connection identifiers to the outbound logical connection identifiers of the established associations, and identifying at least one outbound logical connection identifier that matches the inbound logical connection identifier; and using the application identifier having an established association with the matching outbound logical connection identifier to identify an application to which the responsive inbound message is to be directed.

3. The method of claim 1, wherein acquiring corresponding outbound logical connection identifiers comprises acquiring outbound transport identifiers.

4. The method of claim 3, wherein acquiring outbound transport identifiers comprises acquiring outbound socket identifiers via a transport protocol.

5. The method of claim 3, wherein acquiring outbound transport identifiers comprises acquiring outbound transport process identifiers associated with a transport process.

6. The method of claim 3, wherein acquiring outbound transport identifiers comprises acquiring outbound transport thread identifiers associated with a transport thread.

7. The method of claim 3, wherein acquiring outbound transport identifiers comprises acquiring identifiers based on at least one of a socket, a port, a transport process, a transport thread, and a session available at a transport layer of a software hierarchy.

8. The method of claim 1, wherein establishing associations between the application identifiers and their corresponding outbound logical connection identifiers comprises creating a link between each of the application identifiers and its corresponding outbound logical connection identifier.

9. The method of claim 1, wherein establishing associations between the application identifiers and their corresponding outbound logical connection identifiers comprises correlating the application identifiers and their corresponding outbound logical connection identifiers via an entry in a table.

10. The method of claim 1, wherein establishing associations between the application identifiers and their corresponding outbound logical connection identifiers comprises creating a table of entries, wherein each of the entries comprises one of the application identifiers and its corresponding outbound logical connection identifier used to transfer a particular message.

11. The method of claim 10, wherein creating a table of entries comprises creating the table of entries using a Message Queue (MQ).

12. The method of claim 11, further comprising maintaining the table of entries using the MQ.

13. A processor-implemented method comprising:

receiving an application identifier and an outbound transport identifier, wherein the outbound transport identifier uniquely identifies a logical connection of a Message Queue (MQ) that passes messages between applications of a device and a network transport layer of the device for a message transfer from an instance of an application identified by the application identifier to a destination network device that does not use a compatible MQ for processing the message transfer;

creating an association between the application identifier and the outbound transport identifier;

receiving, via the MQ, an inbound transport identifier associated with receipt of a responsive message originating from the destination network device and destined for the application; and identifying the instance of the application as the target of the responsive message from among a plurality of applications of the device by matching the inbound transport identifier to the outbound transport identifier, and determining the application identifier for the instance of the application from the association between the application identifier and the matched outbound transport identifier; and directing the responsive message to the instance of the application identified by the application identifier.

14. The method of claim 13, wherein:

receiving an application identifier and an outbound transport identifier comprises receiving a plurality of application identifiers and corresponding outbound transport identifiers;

creating an association between the application identifier and the outbound transport identifier comprises creating a plurality of the associations, one for each of the messages transferred from a plurality of applications corresponding to the plurality of application identifiers;

receiving an inbound transport identifier comprises receiving an inbound transport identifier associated with receipt of a responsive message destined for a targeted one of the plurality of applications; and identifying the application as the target of the responsive message comprises matching the inbound transport identifier to one of the outbound transport identifiers of the plurality of associations.

15. The method of claim 14, wherein creating an association between the application identifiers and the outbound transport identifiers comprises creating an ID-table having a plurality of entries, wherein each of the entries comprises one of the application identifiers and one of the outbound transport identifiers.

16. The method of claim 13, wherein receiving an application identifier comprises receiving an existing identifier associated with the application.

17. The method of claim 13, wherein receiving an application identifier comprises receiving a process number corresponding to the application at the MQ.

18. The method of claim 13, wherein receiving the application identifier comprises generating the application identifier at the MQ.

19. The method of claim 13, further comprising determining whether the MQ has a process identifier available, and wherein receiving the application identifier comprises using the process identifier as the application identifier if the process identifier is available at the MQ.

20. The method of claim 19, wherein receiving the application identifier comprises generating the application identifier at the MQ if the process identifier is not available.

21. The method of claim 13, further comprising storing the association between the application identifier and the outbound transport identifier.

22. The method of claim 13, wherein the applications of the device comprise any combination of two or more different applications, instances of an application, and application processes.

23. The method of claim 13, wherein matching the inbound transport identifier to the outbound transport identifier comprises comparing the inbound transport identifier to a plurality of created associations to locate the application identifier from one of the created associations having the matching outbound transport identifier.

24. An apparatus comprising:
a memory to store affiliations of application identifiers and corresponding outbound logical connection identifiers for each of a plurality of outbound messages communicated from the apparatus; and
a Message Queue (MQ) module that passes messages between applications of the apparatus and a network transport layer of the apparatus and is configured to:
compare inbound logical connection identifiers of inbound messages received from a destination network device that does not have a compatible MQ module to the outbound logical connection identifiers of the stored affiliations;
identify local application instances having the application identifiers affiliated with the outbound logical connection identifiers that match the inbound logical connection identifiers; and
direct the inbound message to the identified local application instance affiliated with the outbound logical connection identifier that matches the inbound logical connection identifier.

25. The apparatus as in claim 24, wherein the MQ module is implemented in software, and wherein the apparatus comprises a processor configured to execute the MQ software to establish the affiliations of application identifiers and corresponding outbound logical connection identifiers, to compare the inbound logical connection identifiers to the outbound logical connection identifiers of the stored affiliations, and to identify the local application instance having the application identifier affiliated with the outbound logical connection identifier that matches the inbound logical connection identifier.

26. The apparatus as in claim 24, wherein the MQ module is further configured to establish the affiliation of the application identifiers and corresponding outbound logical connection identifiers in the memory for each of the plurality of outbound messages communicated from the source device.

27. The apparatus as in claim 24, wherein the memory comprises a data structure to store the affiliations of application identifiers and corresponding outbound logical connection identifiers.

28. The apparatus as in claim 27, wherein the data structure comprises a table of the affiliations of application identifiers and corresponding outbound logical connection identifiers.

29. The apparatus as in claim 24, wherein the memory comprises a linked list to store the affiliations of application identifiers and corresponding outbound logical connection identifiers.

30. The apparatus as in claim 24, further comprising a processor, wherein the local application instances comprise any one or more of an instance of an application operable on the processor, a distinct application operable on the processor, and an application process including a plurality of message classes operable on the processor.

31. The apparatus as in claim 24, wherein the apparatus comprises any one of a wireless communicator and a landline computing system.

32. The apparatus as in claim 24, wherein the MQ module comprises a software module architecturally positioned between an application layer associated with the local application and a transport layer.

33. A system comprising
(a) a source device comprising a plurality of source application instances for transmitting messages over a network;
(b) a destination device comprising at least one destination application for receiving one or more of the messages and for providing reply messages in response to the received messages;
wherein the source device comprises:
(i) a memory to store affiliations of application identifiers and corresponding outbound logical connection identifiers for each of a plurality of outbound messages communicated from the source device; and
(ii) a source Message Queue (MQ) module that passes messages between the source application instances of the source device and a network transport layer of the source device and is configured to:
compare inbound logical connection identifiers of the reply messages to the outbound logical connection identifiers of the stored affiliations;
identify the source application instances having the application identifiers affiliated with the outbound logical connection identifiers that match the inbound logical connection identifiers; and
direct the reply messages to the identified source application instances; and
wherein the destination device is configured to transmit and receive the messages without a MQ module that is compatible with the source MQ module.

34. The system as in claim 33, wherein the destination device is configured to directly transmit and receive the messages without a destination MQ.

35. The system as in claim 33, wherein the destination device comprises a destination MQ of a different type than the source MQ.

36. The system as in claim 33, wherein the plurality of source application instances comprise any one or more of discrete applications, instances of a common application, and application processes.

37. The system as in claim 33, wherein the source device and the destination device comprise any one of a wireless communicator and a landline computing system.

38. The system as in claim 33, wherein the network comprises one or more of a wireless network and a landline network.

39. A computer-usable medium having instructions stored thereon which are executable by a computing system for performing steps comprising:
acquiring application identifiers and corresponding outbound logical connection identifiers associated with message transfers from applications of the computing system via a middleware component that passes messages between the applications and a network transport layer of the computing system, wherein instances of the applications transferring messages are uniquely identifiable by their respective application identifiers, wherein the messages transfers are targeted to a destination network device that does not use a compatible middleware component for processing the message transfers;

establishing associations between the application identifiers and their corresponding outbound logical connection identifiers; and directing, via the middleware component, responsive inbound messages received from the destination network device to the instances of the applications having application identifiers associated with the outbound logical connection identifiers that correspond to inbound logical connection identifiers of the responsive inbound messages.

40. A computer-usable medium having instructions stored thereon which are executable by a computing system for performing steps comprising:

receiving, via a middleware component that passes messages between applications and a network transport layer of the computing system, an application identifier and an outbound transport identifier, wherein the outbound transport identifier uniquely identifies a logical connection for a message transfer from an application instance identified by the application identifier to a destination network device that does not use a compatible middleware component for processing the message transfer;

creating an association between the application identifier and the outbound transport identifier;

receiving, via the middleware component, an inbound transport identifier associated with receipt of a responsive message originating from the destination network device and destined for the application instance;

identifying the application instance from among a plurality of applications of the device as the target of the responsive message by matching the inbound transport identifier to the outbound transport identifier, and determining the application identifier for the application instance from the association between the application identifier and the matched outbound transport identifier; and directing, via the middleware component, the responsive inbound message to the application instance.

* * * * *